June 27, 1950 F. E. GODDARD, JR 2,512,794
AIRPLANE JET UNIT POWER PLANT INSTALLATION
Filed May 26, 1948 2 Sheets-Sheet 2
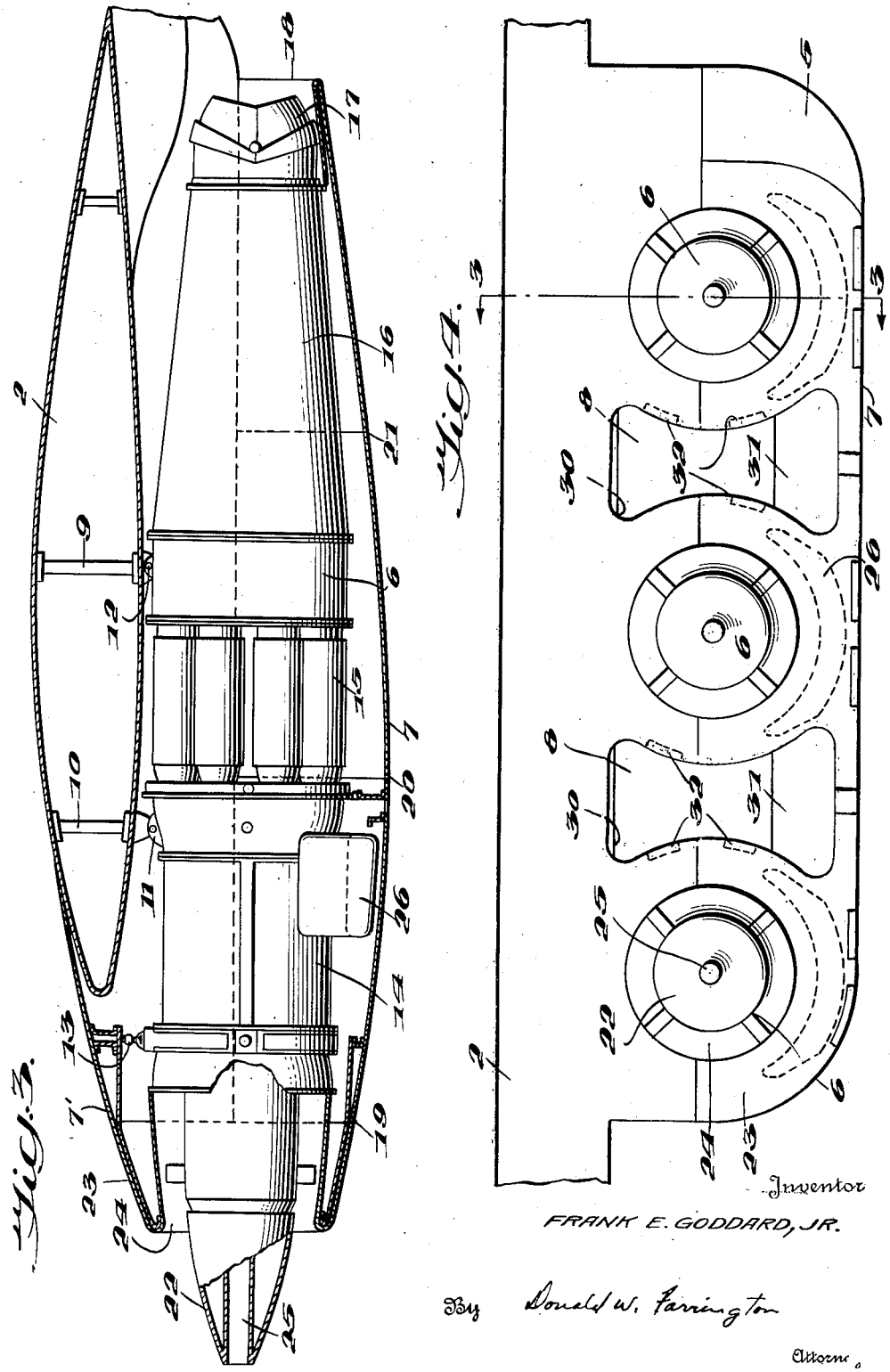
Inventor
FRANK E. GODDARD, JR.
By Donald W. Farrington
Attorney Patented June 27, 1950

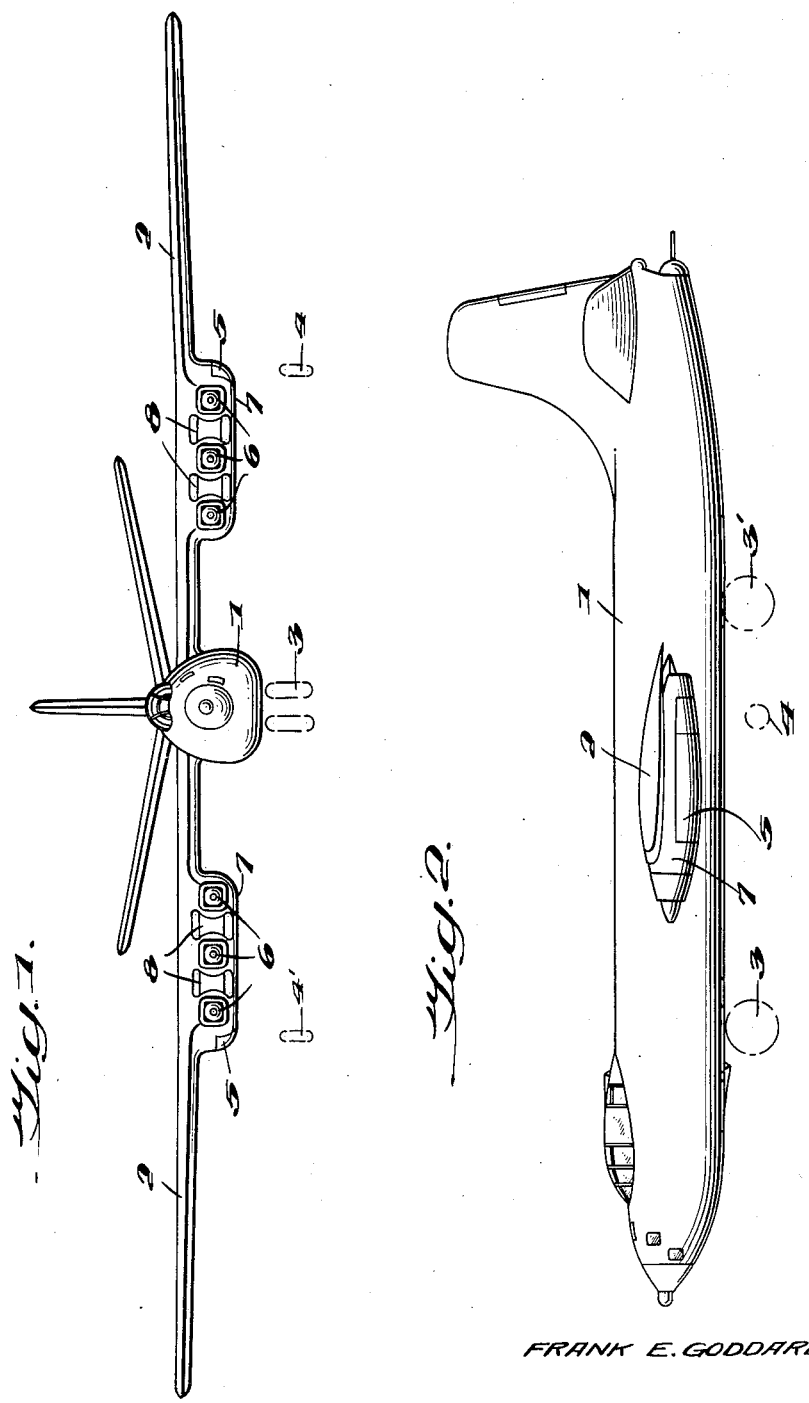

2,512,794

UNITED STATES PATENT OFFICE 2,512,794

AIRPLANE JET UNIT POWER PLANT INSTALLATION

Frank E. Goddard, Jr., Watertown, Mass., assignor to The Glenn L. Martin Company, Middle River, Md., a corporation of Maryland Application May 26, 1948, Serial No. 29,215

8 Claims. (Cl. 244—15)

This invention relates to a novel power plant for a very high-speed airplane and more particularly to the mounting and arrangement of thrust units of the combustion type in the wing of the airplane.

Thrust units of the combustion type have been found to be very satisfactory when used singly as power plants in high-speed airplanes. When used in groups in larger airplanes, it is necessary that the units be so arranged that the advantages obtained from high-speed, thin wings, on which are mounted groups of thrust units, are not eliminated by the power plant installation increasing the drag and altering the air flow path over the wing such as to reduce its effectiveness. It has been found that multiple jet or thrust units can be used very effectively for propulsion of large, high-speed airplanes by arranging the units entirely below the wing and using them in a nacelle of sufficient lateral extent that the thrust units may be spaced, one from another, to form tunnels or air passages between the units. The portion of the nacelle housing the unit extends forwardly of the lading edge of the wing, and is so formed that its forward, streamline shape has a forwardly directed opening to act as an in-take for the air needed for the combustion unit. The units and housing are so proportioned that almost all of the air directly ahead of each unit is required for the combustion unit. The air that is not required for combustion passes over the wing with normal laminar flow or through the tunnels between the units and passes on each side of a power plant or below the unit. Spacing the units thus precludes the cluster of engines from disturbing the path of flow over the wing and around the engine nacelle. The trailing edge ends of the passages through the nacelle are such that the exhaust of the combustion unit and the air around the unit produces an aspirator effect for augmenting thrust.

At the high speeds for which the airplane is designed, divergence of air flow from essentially straight paths is very costly in drag. The portions of the nacelle extending forward and aft of the wing conform to the aerodynamic contour of the wing, so that the high-speed characteristics of the wing are unimpaired by the power plant. The divergence of air flow is further reduced in this invention by separating the jet units and permitting the air flow to flow through the intermediate ducts or passages, rather than to spill over the nacelle and wing in bulk. By this means, the effective thickness ratios of the air foil sections of the nacelle regions are maintained at a very low percent compared to what such an effective thickness ratio would be if a plurality of jet units were grouped on the underside of the wing without passages therebetween.

It is an object of this invention to provide an efficient power plant arrangement employing thrust units of the combustion type with a high-speed wing.

It is another object of this invention to provide multiple thrust units arranged on the underside of the wing in spaced relation, one to another, to minimize the divergence of air flow around the wing.

It is another object of this invention to provide a plurality of thrust units laterally spaced, mounted entirely below the wing encased in a nacelle, having passages formed therethrough between the thrust units to provide for a minimum divergence of air flow.

It is a further object of this invention to provide an arrangement of combustion units in a power plant for a high-speed, thin wing airplane in which the effective thickness ratio in the region of the power plants is maintained at a minimum value.

Further and other objects of this invention will become apparent from the description of the accompanying drawings which form a part of this disclosure and wherein like numerals refer to like parts.

In the drawings:

Figure 1 shows a front elevational view of a high-speed airplane employing the power plant arrangement of this invention.

Figure 2 is a side elevational view of the airplane shown in Figure 1.

Figure 3 is an enlarged sectional view taken on the line 3—3 of Figure 4.

Figure 4 is an enlarged elevational view of the power plant arrangement on the wing.

The airplane embodying the power plant of this invention is shown in Figure 1 as a high-speed, bomber type airplane having an elongated fuselage 1 from which extend wings 2. Because of the small, vertical dimensions of the high-speed wing and the use of the combustion jet units in the power plant, the conventional stowage place for the main landing gear is eliminated. Therefore, main landing gear 3 and 3' are arranged in tandem and stowed in compartments fore and aft of the fuselage. Tip or balancing gear 4 and 4' provide lateral stability for the airplane on the ground and are stowed in compartments at the outboard sides of the engine nacelles and are extended and retracted through doors 5.

The power plant consists of a plurality of thrust units 6, commonly referred to as jet engines, mounted entirely below the thin, high-speed wing. The power plant or engine nacelle 7 is so arranged as to house the jet engines under the wing and provide passages 8 through the nacelle between adjacent engines. As shown in Figure 3, the power plant or combustion unit 6 is suspended from the spars 9 and 10 at points 11 and 12. Unit 6 is suspended entirely below wing 2. Nacelle 7 is formed on its top surface at 7' so that the portion extending forward of the leading edge of the wing fairs into the contour of the upper surface of the wing. The additional suspension 13 supports the forward portion of the jet engine on portion 7' of the nacelle. Engine 6 consists essentially of three parts; the forward portion 14 being the air in-take, 15 being the combustion section, and 16 being the exhaust. The rearwardly directed nozzles 17 is aligned with opening 18 in the rear portion of the nacelle.

The nacelle 7 is formed in sections mounted separately around the jet engine for ease of installation and access for maintenance. The principal divisions of the nacelle are shown by parting lines 19, 20 and 21. The forward section of the nacelle is formed with a conical end 22 and portion 23 between which is an annular air inlet 24. An aperture 25 is formed in the end of portion 22 for a cooling air inlet for the engine accessories. An oil tank 26 is mounted in the next section of the nacelle surrounding the underside of the forward portion of the engine.

Passages 8, shown in Figure 4, are formed in the nacelle by those portions of the nacelle extending around the jet engines. The upper side of the passages conform, as shown at 30, to the underside of the wing. The lower walls 31 of said passages 8 are formed in thin airfoil shapes having high critical speeds. In the walls of passages 8 are formed openings or scoops 32, through which cooling air may be admitted from the passage into the engine nacelle for cooling the interior of the nacelle, or, if necessary, provide cooling air for accessories located within the nacelle.

It will be noted that the tunnels or passages 8 terminate in approximately the same plane as the ends of nozzles 17. Thus, there will be an aspirator effect for the air in the tunnels which will augment the thrusts from the jet engines.

The arrangement of the engines in the nacelle is intended to provide thrust for the wing with a minimum of turbulence or divergence of the air flow from essentially straight paths. The air directly in front of each engine is scooped up through opening 24 to supply the combustion needs of the engine, and that which is not passed through the engine flows around the engine nacelle and over the upper surface of the wing with a minimum of turbulence. This is accomplished as described above by the spacing of the units within the nacelle. This reduces the thickness ratio of the wing in the region of the power plants over what it would be if the engines were merely grouped together within or under the wing.

It is to be understood that certain changes, alterations, modifications and substitutions can be made without departing from the spirit and scope of the appended claims.

I claim as my invention:

1. A power plant for a high-speed, thin wing airplane comprising an engine nacelle depending from said wing, a plurality of thrust units mounted within said nacelle extending chordwise of said wing, said thrust units being spaced spanwise of said wing in said nacelle to form air passageways between said thrust units to decrease the divergence of the air flow around the wing and effective thickness ratio of the wing.

2. A power plant for a high-speed, thin wing airplane comprising an engine nacelle depending from said wing, a plurality of thrust units mounted within said nacelle extending chordwise of said wing, said thrust units being spaced spanwise of said wing in said nacelle, walls faired around each thrust unit forming smooth, streamline air passageways between said thrust units to decrease the divergence of the air flow around the wing and effective thickness ratio of the wing.

3. A power plant for a high-speed, thin wing airplane comprising an engine nacelle depending from said wing, a plurality of thrust units of the combustion type mounted within said nacelle extending chordwise of said wing, said thrust units being spaced spanwise of said wing in said nacelle, walls surrounding said thrust units forming smooth, streamline air passageways between said thrust units to decrease the divergence of the air flow around the wing and effective thickness ratio of the wing, the ends of said passageways terminating at the trailing edge of said thrust units in side-by-side relation, so that the air from said passageways augments the exhaust from said thrust units.

4. A power plant for a high-speed, thin wing airplane comprising an engine nacelle depending from said wing, a plurality of thrust units of the combustion type mounted within said nacelle extending chordwise of said wing, said thrust units being spaced spanwise of said wing in said nacelle, walls faired to surround and enclose said jet units forming air passageways between said thrust units, said air passageways being so proportioned with respect to said thrust units that the surplus air not required by the thrust units passes through said passageways to decrease the divergence of the air flow around the wing and effective thickness ratio of the wing.

5. A power plant for a high-speed, thin wing airplane comprising an engine nacelle depending from said wing, a plurality of thrust units mounted within said nacelle extending chordwise of said wing, said thrust units being spaced spanwise of said wing in said nacelle, walls surrounding and enclosing said thrust units forming smooth, streamline air passageways between said thrust units to decrease the divergence of the air flow around the wing and effective thickness ratio of the wing, the upper wall of said passageways generally conforming to the contour of the under surface of the wing, the lower walls of said passageways being thin airfoil shapes having high critical speeds.

6. A power plant for a high-speed, thin wing airplane comprising an engine nacelle depending from said wing, a plurality of thrust units mounted within said nacelle extending chordwise of said wing, said thrust units being spaced spanwise of said wing in said nacelle, walls surrounding and enclosing said thrust units forming individual housings therefore, and forming air passageways between said thrust units to decrease the divergence of the air flow around the wing and effective thickness ratio of the wing, apertures in said air passageway walls affording communication between the interior of said housings and said air passageways.

7. A power plant for a high-speed, thin wing airplane comprising an engine nacelle depending from said wing, a plurality of thrust units mounted within said nacelle extending chordwise of said wing, said thrust units being spaced spanwise of said wing in said nacelle, walls surrounding and enclosing said thrust units forming individual housings therefor, and forming air passageways between said thrust units to decrease the divergence of the air flow around the wing and effective thickness ratio of the wing, air scoop means formed in said walls for transferring air from said passageways to the inside of said housings.

8. A power plant for a high-speed, thin wing airplane comprising an engine nacelle depending from said wing, a plurality of thrust units of the combustion type mounted within said nacelle extending chordwise of said wing, the portion of said nacelle surrounding said thrust units extending forward of the leading edge of the wing, said portion having formed therein a forwardly directed annular opening for admitting air for said thrust units, said thrust units being spaced spanwise of said wing in said nacelle, walls surrounding said thrust units forming smooth, streamline air passageways between said thrust units to decrease the divergence of the air flow around the wing and effective thickness ratio of the wing, the ends of said passageways terminating at the trailing edge of said thrust units in side-by-side relation, so that the air from said passageways augments the exhaust from said thrust units.

FRANK E. GODDARD, Jr.

REFERENCES CITED

The following references are of record in the file of this patent:

UNITED STATES PATENTS

| Number | Name | Date |
|---|---|---|
| 2,420,323 | Meyer et al. | May 13, 1947 |

FOREIGN PATENTS

| Number | Country | Date |
|---|---|---|
| 544,834 | Germany | Feb. 29, 1932 |
| 688,869 | France | May 19, 1930 |